US012624880B2

(12) United States Patent
Mitchell et al.

(10) Patent No.: US 12,624,880 B2
(45) Date of Patent: May 12, 2026

(54) INFUSED ICE MAKER APPLIANCE

(71) Applicant: Haier US Appliance Solutions, Inc.,
Wilmington, DE (US)

(72) Inventors: Alan Joseph Mitchell, Louisville, KY
(US); Vineeth Vijayan, Louisville, KY
(US)

(73) Assignee: Haier US Appliance Solutions, Inc.,
Wilmington, DE (US)

( * ) Notice: Subject to any disclaimer, the term of this
patent is extended or adjusted under 35
U.S.C. 154(b) by 143 days.

(21) Appl. No.: 18/535,199

(22) Filed: Dec. 11, 2023

(65) Prior Publication Data

US 2025/0189199 A1    Jun. 12, 2025

(51) Int. Cl.
| | |
|---|---|
| *F25C 1/25* | (2018.01) |
| *A23G 9/04* | (2006.01) |
| *F25C 1/04* | (2018.01) |

(52) U.S. Cl.
CPC ................. *F25C 1/25* (2018.01); *A23G 9/04*
(2013.01); *F25C 1/04* (2013.01); *F25C*
*2305/0221* (2021.08); *F25C 2400/10* (2013.01)

(58) Field of Classification Search
CPC ...... F25C 1/04; F25C 1/25; F25C 2305/0221;
F25C 2400/10; A23G 9/04
See application file for complete search history.

(56) References Cited

U.S. PATENT DOCUMENTS

| | | | |
|---|---|---|---|
| 2,237,525 | A | 4/1941 | Nolan |
| 6,672,097 | B1 * | 1/2004 | Ashley ................... A23G 9/163 |
| | | | 62/340 |
| 8,794,126 | B2 | 8/2014 | Skalski et al. |
| 9,038,410 | B2 | 5/2015 | Erbs et al. |
| 9,066,529 | B2 | 6/2015 | Fassberg et al. |
| 9,759,470 | B2 | 9/2017 | Zisholtz et al. |
| 10,378,806 | B2 | 8/2019 | Boarman et al. |
| 2009/0120306 | A1 | 5/2009 | DeCarlo et al. |
| 2010/0075013 | A1 * | 3/2010 | Takata ..................... A23G 9/28 |
| | | | 99/461 |
| 2016/0205988 | A1 | 7/2016 | Bird et al. |

(Continued)

FOREIGN PATENT DOCUMENTS

| | | |
|---|---|---|
| CN | 101871711 B | 8/2012 |
| CN | 102297551 B | 4/2013 |

(Continued)

*Primary Examiner* — Elizabeth J Martin
*Assistant Examiner* — Adam Dorrel Moore
(74) *Attorney, Agent, or Firm* — Dority & Manning, P.A.

(57) ABSTRACT

An ice maker appliance includes an additive dispensing assembly and a mold body. The additive dispensing assembly includes an additive cup configured to receive a volume of liquid additive and a dispensing tube. The ice maker appliance also includes a fill tube. The dispensing tube is aligned with the fill tube whereby the liquid additive from the dispensing tube mixes with a flow of liquid water from the fill tube. The mold body includes a mold cavity. The mold body is positioned downstream of the dispensing tube and the fill tube and is configured for receiving the mixed flow of liquid water and liquid additive whereby a mixture of liquid water and liquid additive is formed in the mold cavity. The mold cavity is further configured for retaining the mixture of liquid water and liquid additive to form an ice piece from the mixture in the mold cavity.

18 Claims, 10 Drawing Sheets

(56)            References Cited

U.S. PATENT DOCUMENTS

2016/0216020  A1      7/2016  Safrin
2017/0042181  A1      2/2017  Fiaschi
2020/0088452  A1 *    3/2020  Junge ........................ F25C 1/04

FOREIGN PATENT DOCUMENTS

DE            20218085  U1      2/2003
EP             4275509  A1 *  11/2023   .............. A23G 9/08

* cited by examiner

206

210

234

210

INFUSED ICE MAKER APPLIANCE

FIELD OF THE INVENTION

The present subject matter relates generally to ice maker appliances, and in particular to ice maker appliances configured to produce infused ice from water and an additive such as a flavorant, e.g., ice that is infused with one or more additives.

BACKGROUND OF THE INVENTION

Certain refrigerator appliances include an ice maker. An ice maker appliance may also be a stand-alone appliance designed for use in commercial and/or residential settings. To produce ice, liquid water is directed to the ice maker and frozen. For example, certain ice makers include a mold body for receiving liquid water. In some systems, a working fluid is used to directly cool the mold body, e.g., by conductive heat transfer. In other systems, the air around the mold body may be cooled such that the mold body is indirectly cooled via the air. When the mold body is cooled, directly and/or indirectly, ice may be formed from the liquid water therein. After ice is formed in the mold body, it may be harvested from the mold body and stored within an ice bin or bucket within the refrigerator appliance.

Conventional ice maker appliances are configured for producing ice pieces solely from water, e.g., tap water or water from other similar sources. Thus, the resulting ice from such ice maker appliances may be perceived as bland and generally provides little to no flavor or nutrients.

Accordingly, an ice maker with features for producing infused ice from water and an additive, such as a flavorant, electrolytes, vitamins, and/or other similar additives, would be desirable.

BRIEF DESCRIPTION OF THE INVENTION

Aspects and advantages of the invention will be set forth in part in the following description, or may be apparent from the description, or may be learned through practice of the invention.

According to an exemplary embodiment, a refrigerator appliance is provided. The refrigerator appliance includes a cabinet with a chilled chamber defined within the cabinet. The refrigerator appliance further includes an ice making assembly. The ice making assembly includes an additive dispensing assembly comprising an additive cup configured to receive a volume of liquid additive and a dispensing tube downstream of the additive cup. The ice making assembly also includes a fill tube in fluid communication with a water supply. An outlet of the dispensing tube is aligned with an outlet of the fill tube whereby a flow of the liquid additive from the dispensing tube mixes with a flow of liquid water from the fill tube to form a mixed flow of liquid water and liquid additive. The ice making assembly further includes a mold body comprising a mold cavity. The mold body is positioned downstream of the dispensing tube and the fill tube. The mold cavity is configured for receiving the mixed flow of liquid water and liquid additive whereby a mixture of liquid water and liquid additive is formed in the mold cavity. The mold cavity is further configured for retaining the mixture of liquid water and liquid additive to form an ice piece from the mixture in the mold cavity.

According to another exemplary embodiment, an ice maker appliance is provided. The ice maker appliance includes an additive dispensing assembly comprising an additive cup configured to receive a volume of liquid additive and a dispensing tube downstream of the additive cup. The ice making assembly also includes a fill tube in fluid communication with a water supply. An outlet of the dispensing tube is aligned with an outlet of the fill tube whereby a flow of the liquid additive from the dispensing tube mixes with a flow of liquid water from the fill tube to form a mixed flow of liquid water and liquid additive. The ice making assembly further includes a mold body comprising a mold cavity. The mold body is positioned downstream of the dispensing tube and the fill tube. The mold cavity is configured for receiving the mixed flow of liquid water and liquid additive whereby a mixture of liquid water and liquid additive is formed in the mold cavity. The mold cavity is further configured for retaining the mixture of liquid water and liquid additive to form an ice piece from the mixture in the mold cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
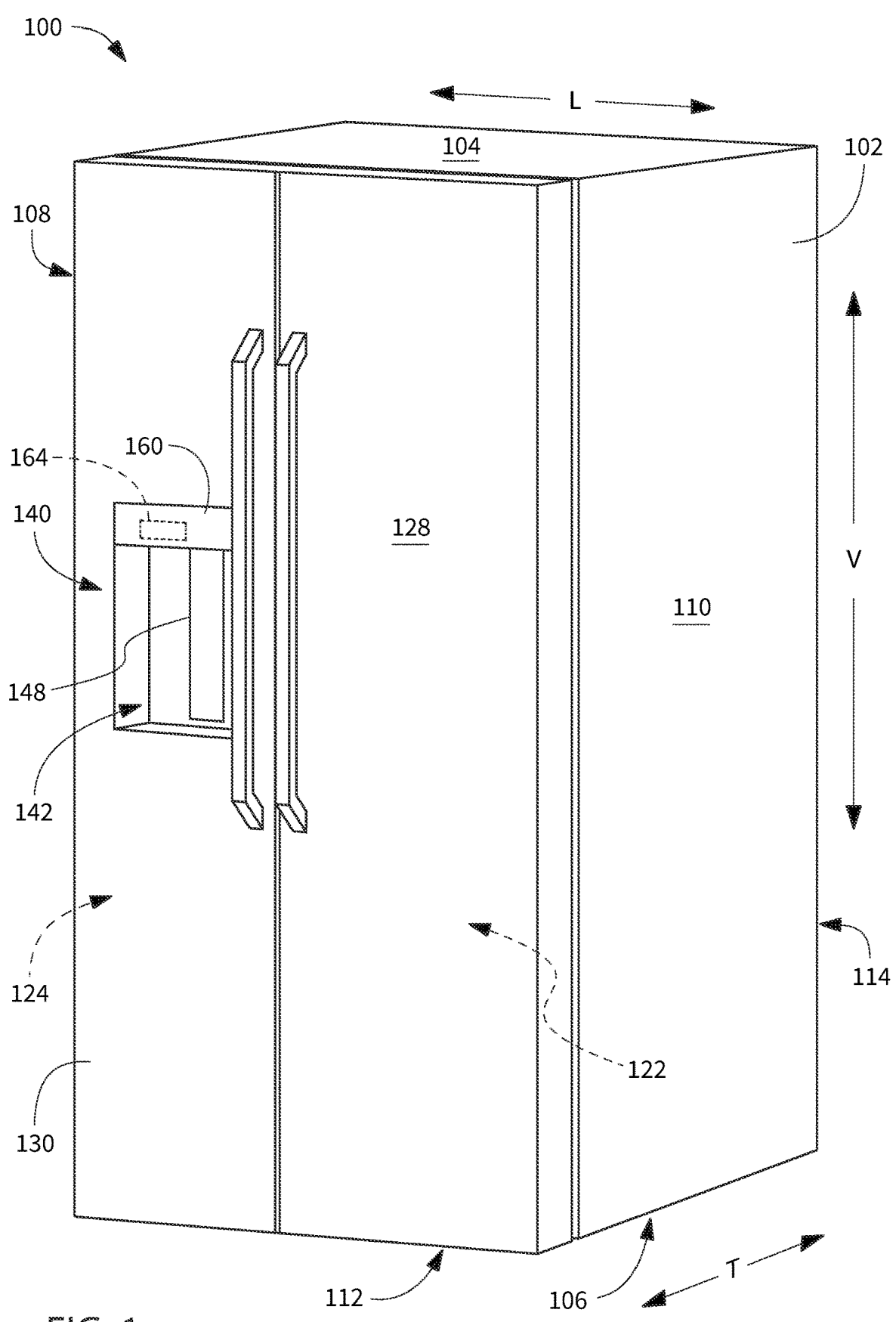
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise. As used herein, the terms "first," "second," and "third" may be used interchangeably to distinguish one component from another and are not intended to signify location or importance of the individual components.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent a right side (e.g., second side 110) of housing 102 and a freezer chamber 124 arranged at or adjacent a left side (e.g., first side 108) of housing 102. As such, refrigerator appliance 100 is generally referred to as a side-by-side refrigerator. It is recognized, however, that the benefits of the present disclosure apply to other types and styles of refrigerator appliances such as, e.g., a top mount refrigerator appliance, a bottom mount refrigerator appliance, or a single door refrigerator appliance (such as a refrigerator appliance with a single chilled chamber therein, e.g., a standalone freezer or standalone refrigerator appliance, such as a columns unit). Consequently, the description set forth herein is for illustrative purposes only and is not intended to be limiting in any aspect to any particular refrigerator chamber configuration.

Refrigerator door 128 is rotatably hinged to an edge of housing 102 for selectively accessing fresh food chamber 122. In addition, a freezer door 130 is arranged opposite refrigerator door 128 for selectively accessing freezer chamber 124. Refrigerator door 128 and freezer door 130 are shown in the closed configuration in FIG. 1. One skilled in the art will appreciate that other chamber and door configurations are possible and within the scope of the present invention.

Referring still to FIG. 1, a dispensing assembly 140 will be described according to exemplary embodiments of the present subject matter. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of the doors, e.g., freezer door 130. In this regard, dispenser recess 142 is defined on front side 112 of refrigerator appliance 100 such that a user may operate dispensing assembly 140 without opening freezer door 130. In addition, dispenser recess 142 is positioned at a predetermined elevation convenient for a user to access ice and enabling the user to access ice without the need to bend over. In the exemplary embodiment, dispenser recess 142 is positioned at a level that approximates the chest level of a user.

Dispensing assembly 140 includes an ice dispenser including a discharging outlet for discharging ice from dispensing assembly 140. An actuating mechanism 148, shown as a paddle, is mounted below discharging outlet for operating an ice or water dispenser. In alternative exemplary embodiments, any suitable actuating mechanism may be used to operate the dispenser. For example, the dispenser may include a sensor (such as an ultrasonic sensor) or a button rather than the paddle. The discharging outlet and the actuating mechanism 148 are an external part of the ice and/or water dispenser and are mounted in dispenser recess 142.

Returning again to FIG. 1, a control panel 160 is provided for controlling the mode of operation. For example, control panel 160 may include one or more selector inputs (not shown), such as knobs, buttons, touchscreen interfaces, etc., such as a water dispensing button and an ice-dispensing button, for selecting a desired mode of operation such as crushed or non-crushed ice. In addition, the selector inputs may be used to specify a fill volume or method of operating dispensing assembly 140. In this regard, the selector inputs may be in communication with a processing device or controller 164. Signals generated in controller 164 operate refrigerator appliance 100 and dispensing assembly 140 in response to selector inputs. Additionally, a display, such as an indicator light or a screen, may be provided on control panel 160. The display may be in communication with controller 164, and may display information in response to signals from controller 164.

As used herein, "processing device" or "controller" may refer to one or more microprocessors or semiconductor devices and is not restricted necessarily to a single element. The processing device can be programmed to operate refrigerator appliance 100 and dispensing assembly 140. The processing device may include, or be associated with, one or more memory elements (e.g., non-transitory storage media). In some such embodiments, the memory elements include electrically erasable, programmable read only memory (EEPROM). Generally, the memory elements can store information accessible to the processing device, including instructions that can be executed by processing device. Optionally, the instructions can be software or any set of instructions and/or data that when executed by the processing device, cause the processing device to perform operations. For example, the instructions may include a software package configured to operate the system to, e.g., execute the exemplary methods described below. In exemplary embodiments, the various method steps as disclosed herein may be performed, e.g., in whole or part, by controller 164 and/or another, separate, dedicated controller.

Figure 2:
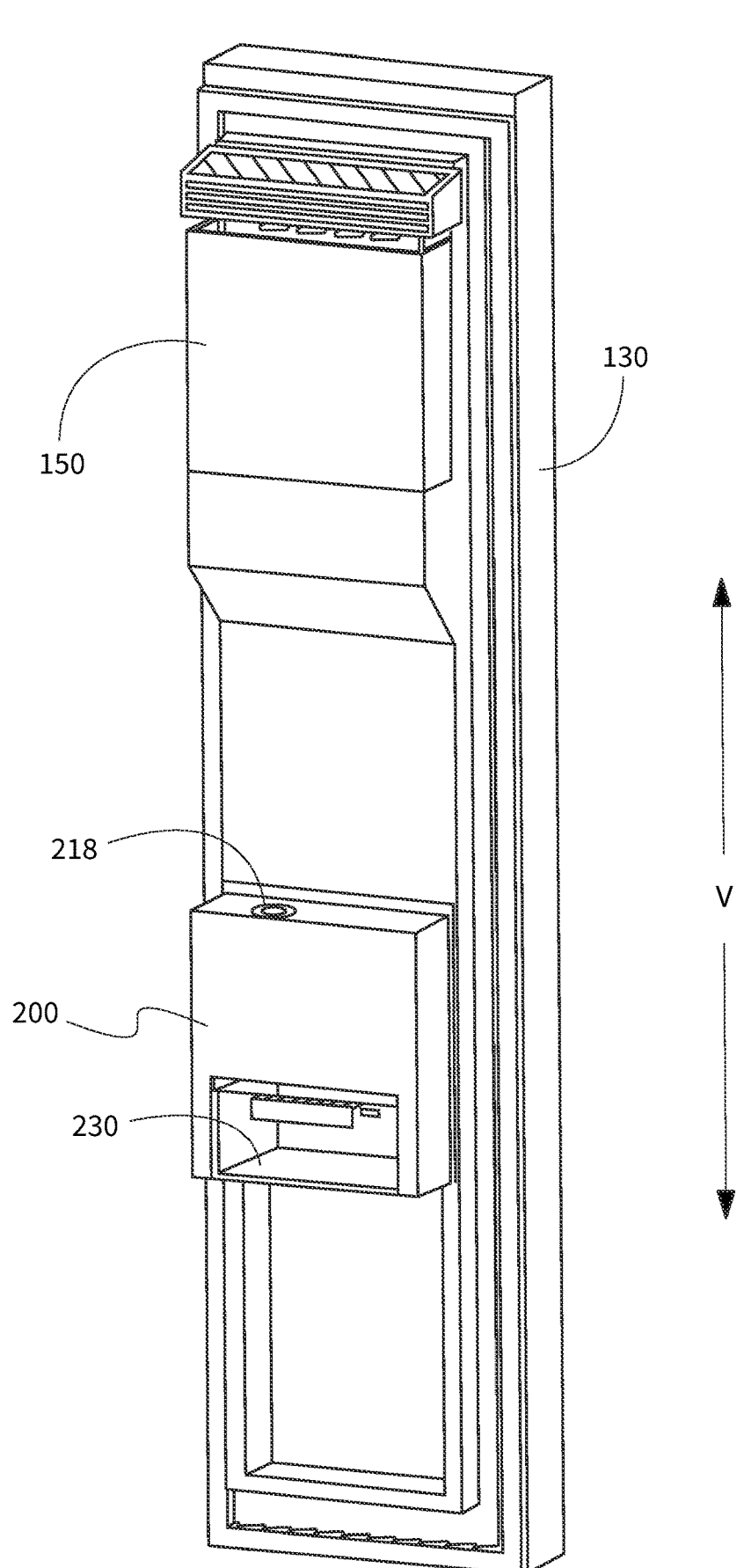
FIG. 2 provides a perspective view of an internal side of an exemplary door for a refrigerator appliance such as the exemplary refrigerator appliance of FIG. 1.
Figure 3:
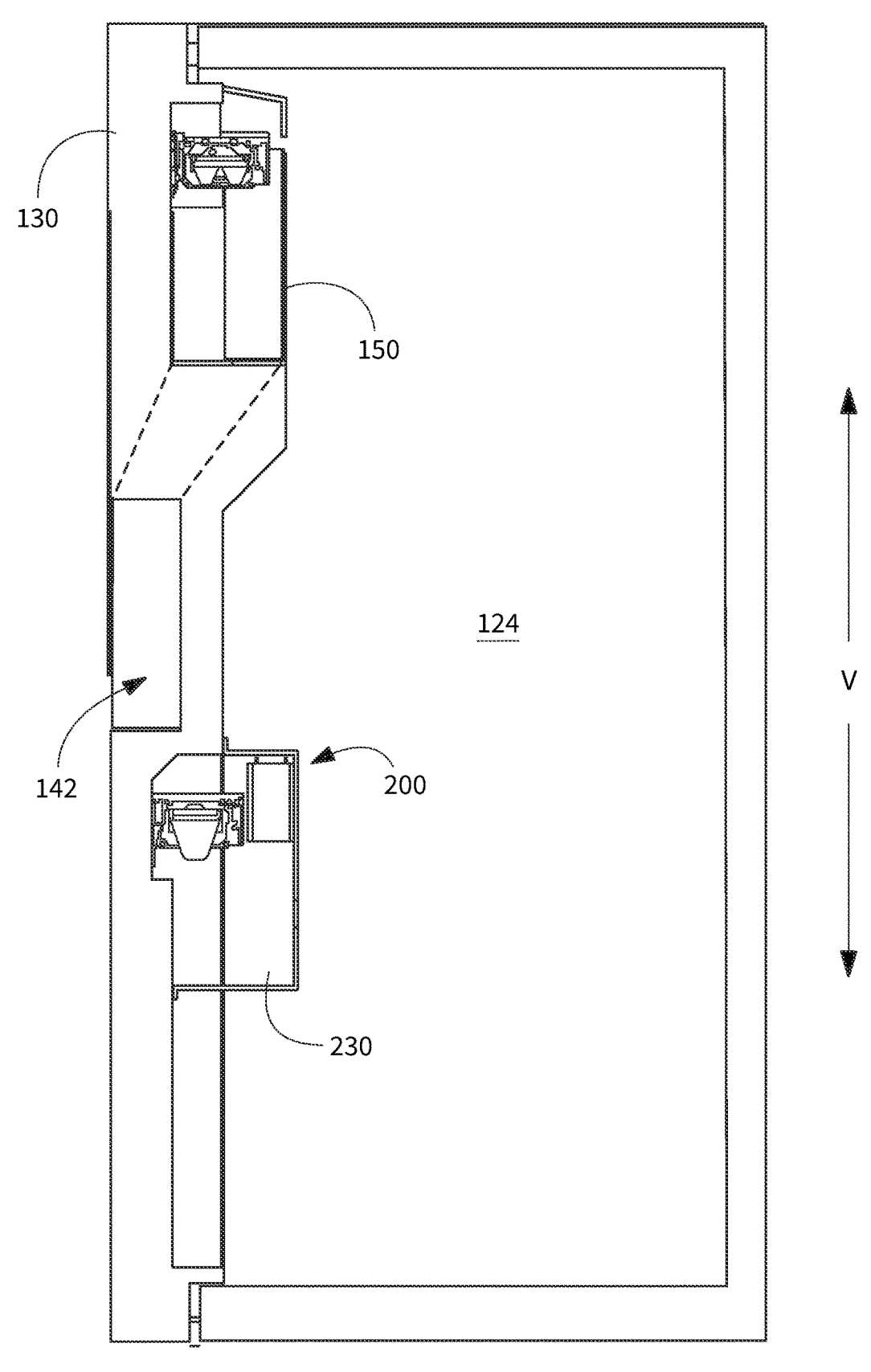
FIG. 3 provides a section view of the exemplary refrigerator appliance of FIG. 1.

Turning now to FIG. 2, an inner side of freezer door 130 is illustrated. FIG. 3 illustrates a section through the exemplary refrigerator appliance 100 at the freezer chamber 124. As may be seen in FIGS. 2 and 3, an icebox 150 may be defined on the inner side of the freezer door 130. Thus, as shown, e.g., in FIG. 3, the icebox 150 may be disposed within the freezer chamber 124 when the freezer door 130 is in the closed position. The icebox 150 may house an ice maker, which may be a primary ice maker of the refrigerator appliance and which may be configured to supply ice to dispenser recess 142. In this regard, for example, icebox 150 may define an ice making chamber for housing ice maker (e.g., a first or primary ice maker configured for making water ice or plain ice), a storage mechanism, and a dispensing mechanism.

Refrigerator appliance 100 may further include a second ice maker 200 (sometimes also referred to as an ice making assembly 200), such as may be configured for making infused ice, e.g., flavored ice. For example, when the first or primary ice maker configured for making water ice or plain ice is provided, the second ice maker 200 which makes infused ice may be a specialty or auxiliary ice maker. As may be seen in FIGS. 2 and 3, ice making assembly 200 may be defined on the inner side of the freezer door 130, such that the ice making assembly 200 may be disposed within the freezer chamber 124 when the freezer door 130 is in the closed position. The ice maker 200 is generally configured for freezing liquid water mixed with an additive to form the infused ice, e.g., infused ice pieces such as ice cubes. For example, the ice maker 200 may include one or more mold cavities 226 (see, e.g., FIGS. 6 and 7) defined therein, such as in a mold body 220 thereof, and the liquid water and additive may be directed into the mold cavity (or cavities) 226 of the ice maker 200. The liquid water and additive may be mixed together while flowing to the mold body 220 and/or may mix in the mold body 220, and the mixed liquid may then be retained in the mold body at a temperature at or below the freezing point of water to form an ice piece or ice pieces. Such ice pieces may be harvested from the mold body 220 and stored in an ice bin 230, e.g., below the mold body 220 such that the ice bin 230 may receive the infused ice pieces from the mold body 220 by gravity.

As mentioned above, the present disclosure may also be applied to other types and styles of refrigerator appliances such as, e.g., a top mount refrigerator appliance, a bottom mount refrigerator appliance, or may be applied to a standalone ice maker appliance. Variations and modifications may be made to ice making assembly while remaining within the scope of the present subject matter. Accordingly, the description herein of the icebox 150 and ice maker 200 on the door 130 of the freezer chamber 124 is by way of example only. In other example embodiments, the ice making assembly or ice maker 200 may be positioned in the fresh food chamber 122, e.g., of the illustrated side by side refrigerator, of a bottom-mount refrigerator, of a top-mount refrigerator, or any other suitable refrigerator appliance. As another example, the ice making assembly 200 may also be provided in a standalone ice maker appliance and/or may be the only ice making assembly in the ice maker appliance. As used herein, the term "standalone ice maker appliance" refers to an appliance of which the sole or primary operation is generating or producing ice, e.g., without any additional or other chilled chambers, whereas the more general term "ice maker appliance" includes such appliances as well as appliances with diverse capabilities in addition to making ice, such as a refrigerator appliance equipped with an ice maker, among other possible examples.

In some embodiments, the ice maker 200 may include a dedicated controller, e.g., similar to the controller 164 of the refrigerator appliance 100 which is described above. In embodiments where the ice maker 200 is incorporated into a refrigerator appliance such as the exemplary refrigerator appliance 100 described hereinabove, the dedicated controller may be in addition to the controller 164 of the refrigerator appliance and may be in communication with the controller 164 of the refrigerator appliance 100, and the controller of the ice maker 200 may be in operative communication with other components of the ice maker 200 and may be configured specifically for controlling or directing operation of such components.

Figure 4:
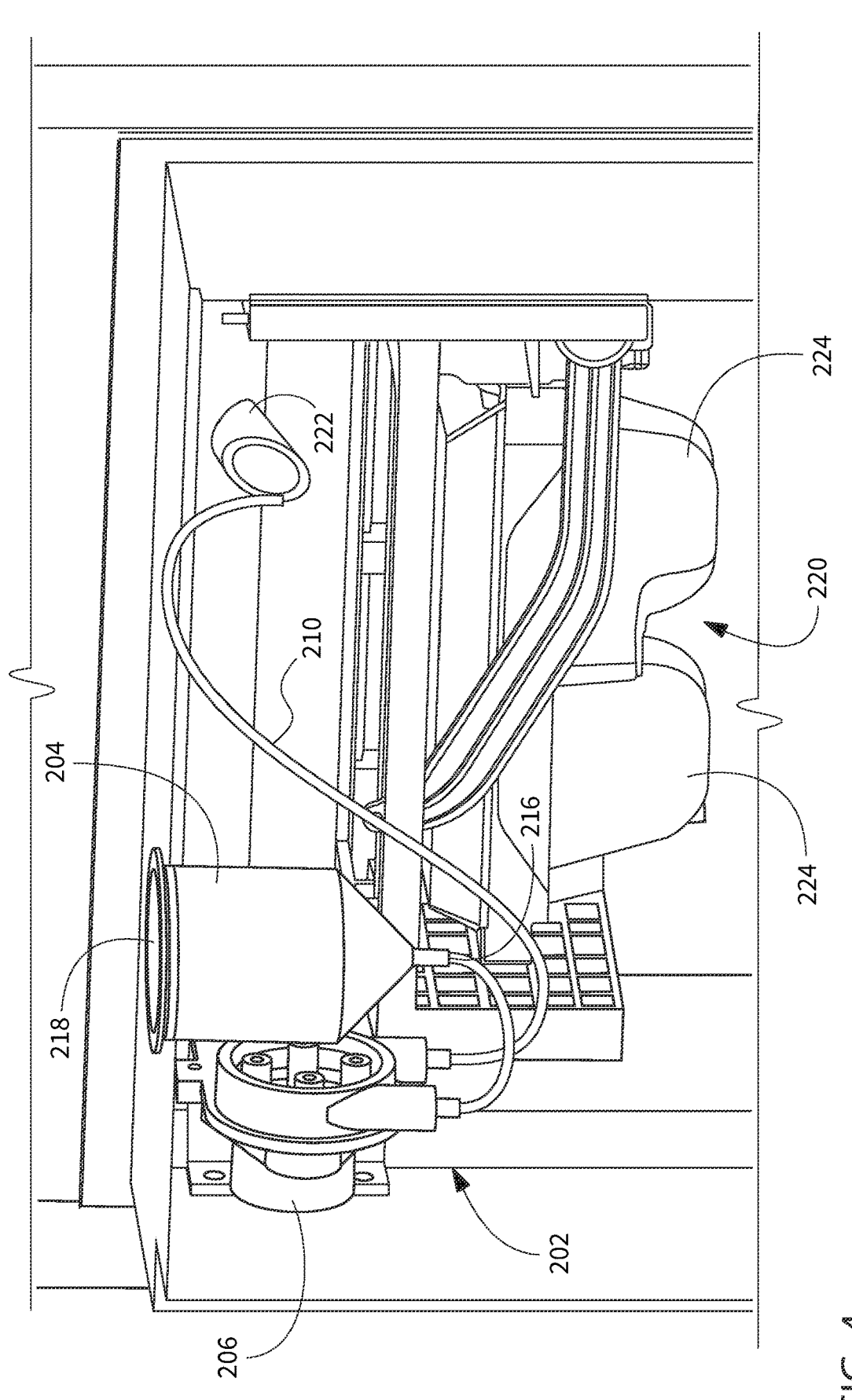
FIG. 4 provides a perspective view of an ice making assembly for an ice maker appliance, such as the exemplary refrigerator appliance of FIG. 1.

Referring now to FIG. 4, a perspective views of an exemplary embodiment of the ice maker 200 is illustrated. In some embodiments, e.g., as illustrated in FIG. 4, the ice maker 200 may include an additive dispensing assembly 202. The additive dispensing assembly 202 may include an additive cup 204, a dosing pump 206 connected to the additive cup 204, and a dispensing tube 210. The dispensing tube 210 may be downstream of the additive cup 204, such that a flow of additive from the additive cup 204 may be urged by the dosing pump 206 to the mold body 220 via the dispensing tube 210. For example, the dispensing tube 210 may extend from an inlet of the dispensing tube 210 coupled to the additive cup 204 at an outlet 216 of the additive cup 204 to an outlet 211 (FIG. 10) of the dispensing tube 210. The ice maker 200 may further include a water fill tube 222, e.g., which is coupled to a water supply to provide plain water (e.g., tap water such as from a municipal water system, well, or other similar source of potable water, such that "plain water" is intended to refer to typical drinking water as is understood by those of ordinary skill in the art). The mold body 220 may be downstream of, e.g., below, the additive dispensing tube 210 and the water fill tube 222, such that the mold body 220 receives both water and additive in order to form infused ice from both the liquid water and the additive in the mold body 220.

Figure 5:
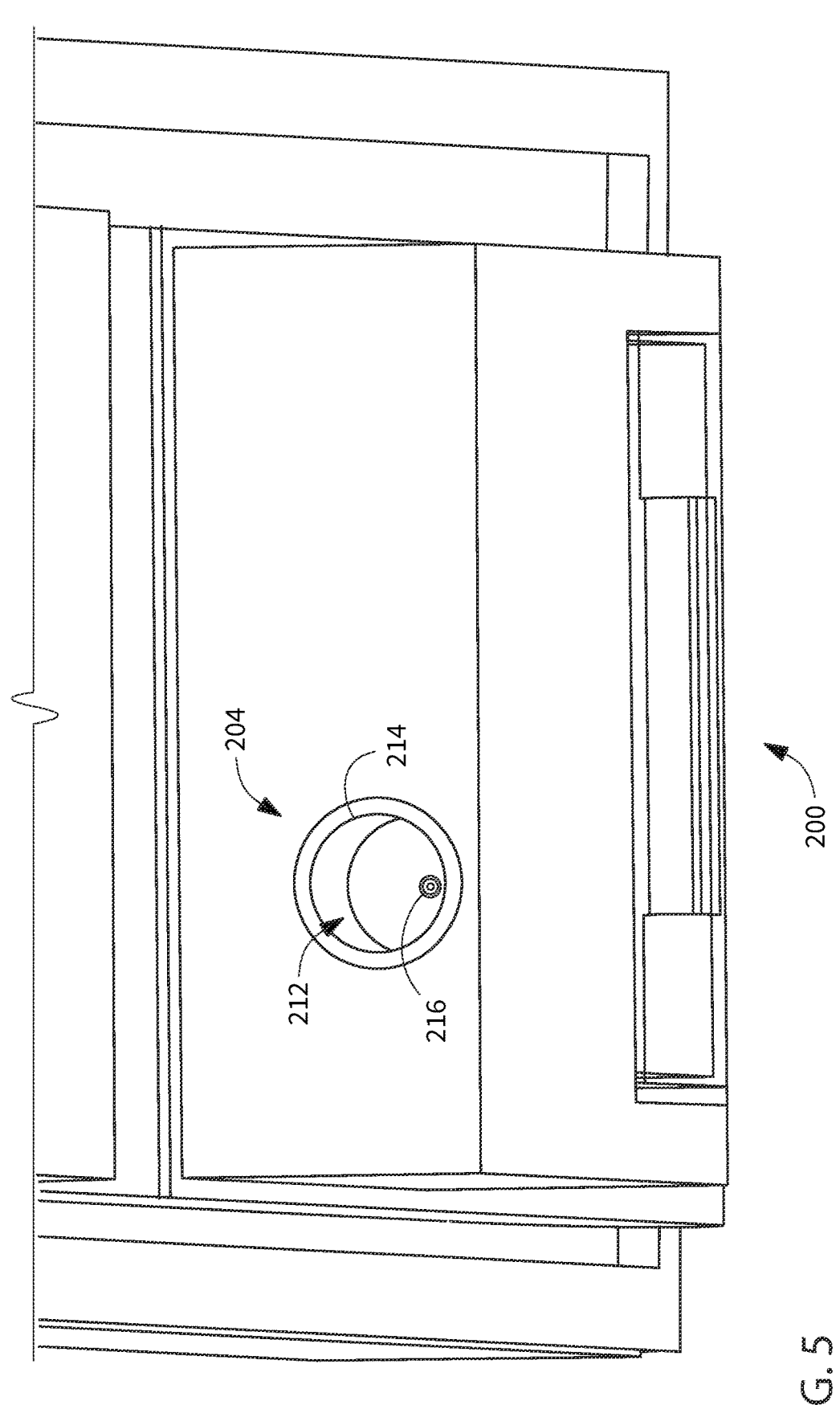
FIG. 5 provides a top perspective view looking down at the exemplary ice making assembly of FIG. 4.

As may be seen, e.g., in FIG. 5, the additive cup 204 may define an internal volume 212 which is sized and configured to hold a volume of liquid additive, such as a volume that is, in proportion to the total volume of the mold cavity (or cavities) 226, sufficient for mixing with a volume of water to form infused ice pieces in the mold cavity 226. Thus, the additive cup 204 may be configured to hold an additive, such as a liquid additive, for mixing with liquid water as the liquid water flows from a fill tube 222 (see, e.g., FIG. 4) of the ice maker 200. The additive cup 204 may receive the additive into the internal volume 212 of the additive cup through a top opening 214 of the additive cup 204. Once filled, the internal volume 212 of the additive cup 204 may be enclosed and sealed by a cap 218 (see, e.g., FIG. 4), which is configured to sealingly engage the top opening 214. The additive may flow from the additive cup via an outlet 216 positioned at the bottom of the additive cup 204. For example, the additive may be provided to and stored in the additive cup 204 in a liquid state, and may remain in the liquid state at least until the additive mixes with liquid water. Thus, for example, the additive may be chemically designed to remain liquid in a chilled chamber, e.g., freezer chamber 124, while held in the additive cup 204 and while flowing (e.g., as urged by the dosing pump 206) through the dispensing tube 210, such as the additive may have a low freezing point, e.g., a freezing point less than the freezing point of water. Further by way of example, the chilled chamber, e.g., freezer chamber 124, may be operable as low as six degrees below zero Fahrenheit (–6° F.), and the additive may have a freezing point less than zero degrees Fahrenheit (0° F.), such as the additive may have a freezing point of negative six degrees Fahrenheit (–6° F.) or less than negative six degrees Fahrenheit (–6° F.).

Figure 6:
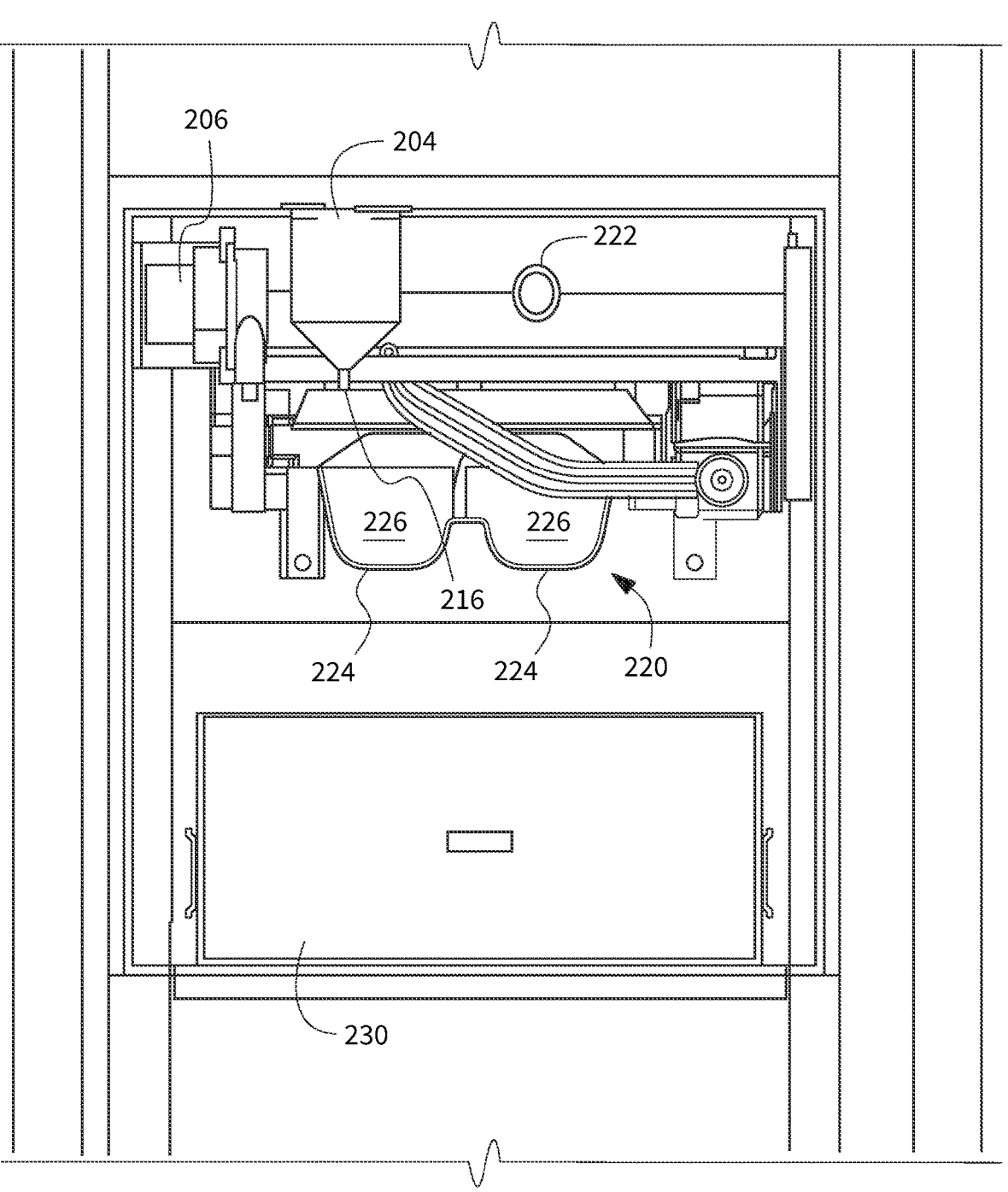
FIG. 6 provides an elevation view of the exemplary ice making assembly of FIG. 4.
Figure 7:
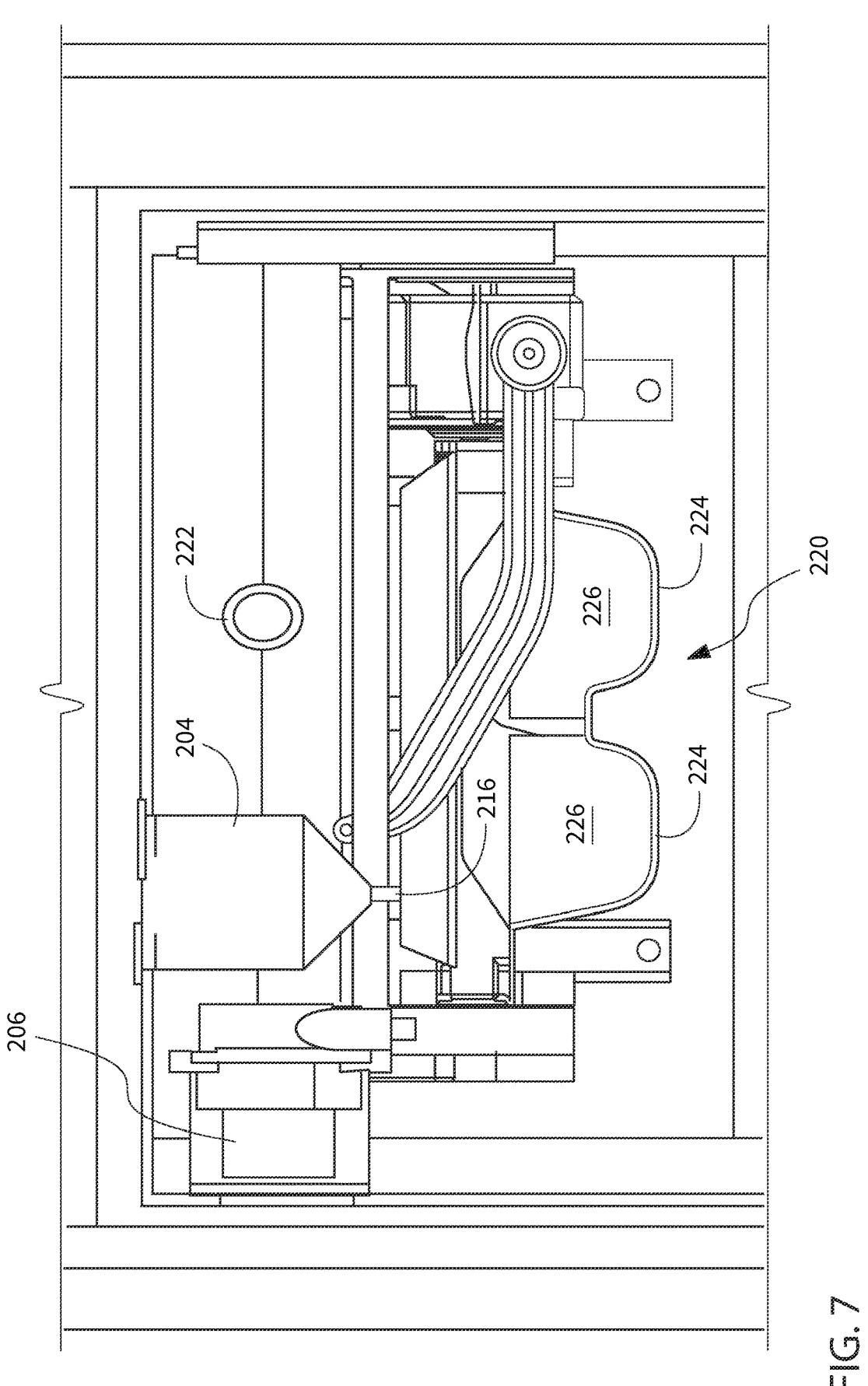
FIG. 7 provides an enlarged elevation view of the exemplary ice making assembly of FIG. 4.

As may be seen, e.g., in FIGS. 6 and 7, the mold body 220 of the ice maker 200 may include one or more compartments 224 which define mold cavities 226 for receiving liquid therein, and the liquid may be retained within the compartment(s) 224 until ice is formed, e.g., liquid water mixed with additive may be retained in the mold body 220, and the liquid water mixed with additive may be held in the mold cavity 226 and cooled until the mixture freezes, thereby forming one or more enhanced or infused ice pieces, e.g., comprising both water and the additive.

Figure 8:
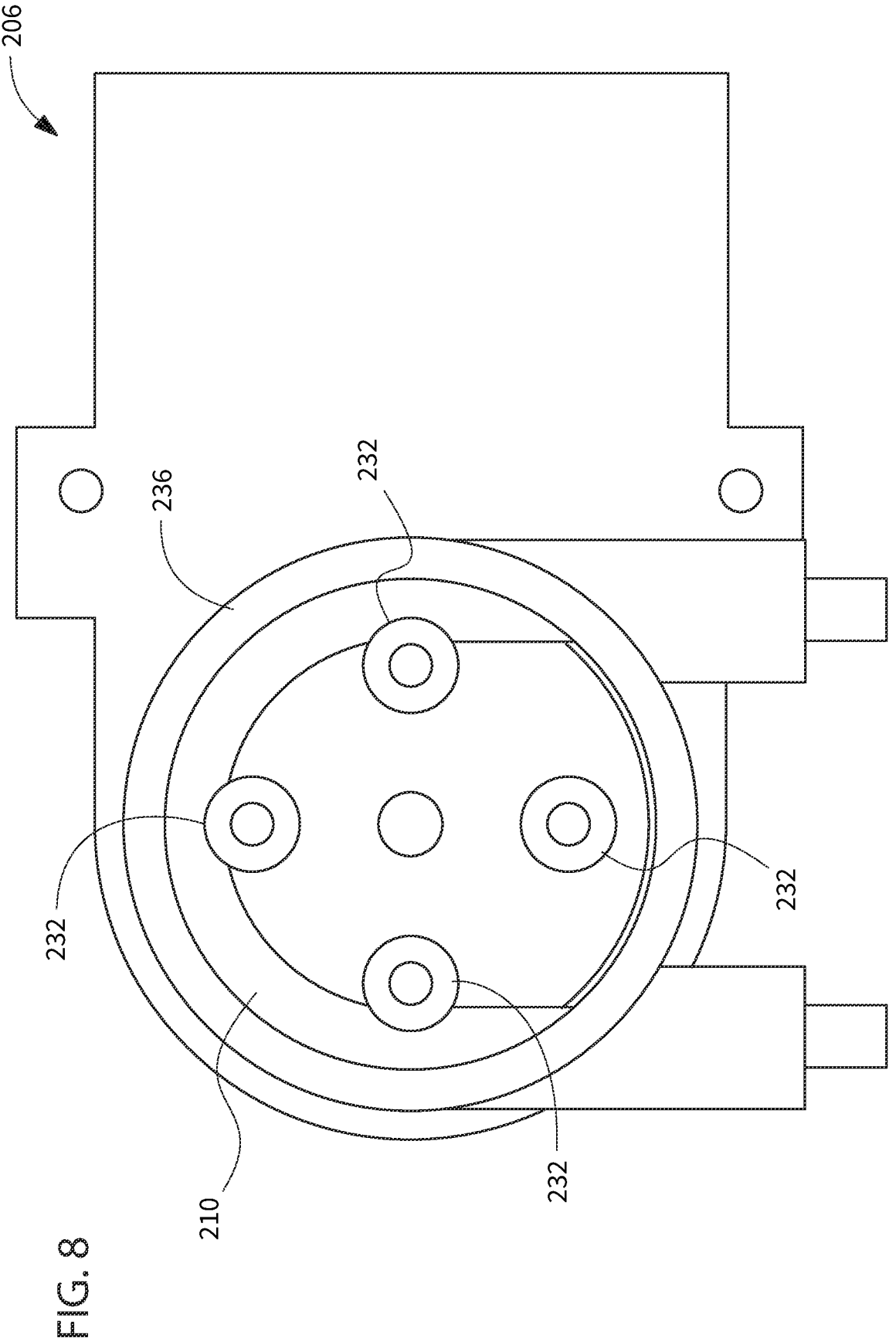
FIG. 8 provides a front elevation view of an exemplary dosing pump for an ice making assembly such as the exemplary ice making assembly of FIG. 4.
Figure 9:
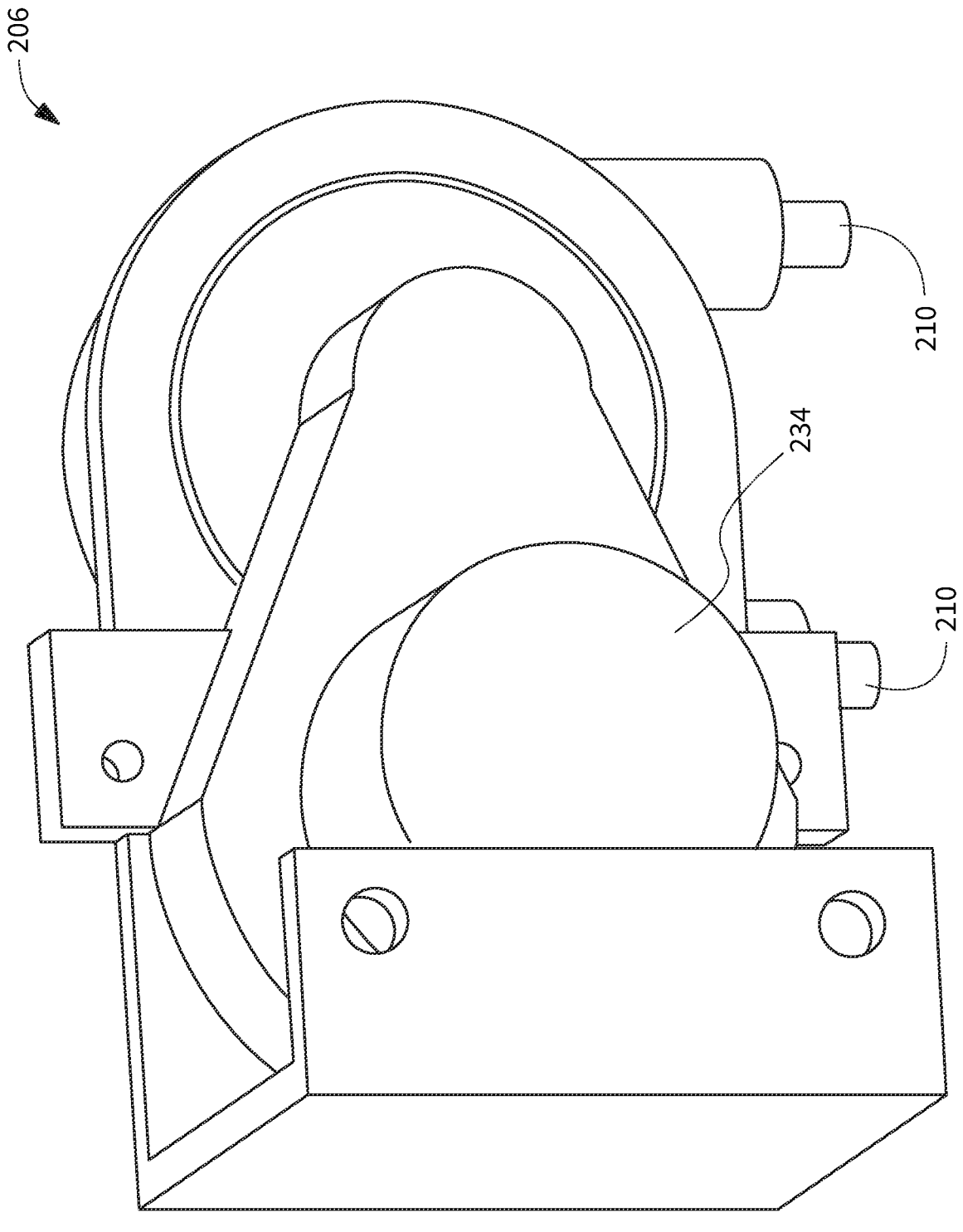
FIG. 9 provides a rear perspective view of the exemplary dosing pump of FIG. 8.

Referring now to FIGS. 8 and 9, in some embodiments, the dosing pump 206 may be a peristaltic pump. For example, a segment of the dispensing tube 210 may extend through a housing 236 of the peristaltic pump 206, and the peristaltic pump 206 may include a plurality of rollers 232, each of which compresses a portion of the dispensing tube 210 between the roller 232 and the housing 236. The peristaltic pump 206 may further include a motor 234 (FIG. 9), such as a stepper motor, which is operable to rotate the rollers 232 within the housing 236 such that the rollers 232 progressively and sequentially compress portions of the dispensing tube 210, thereby urging the additive from the additive cup 204 through the dispensing tube 210 and to the mold body 220.

Figure 10:
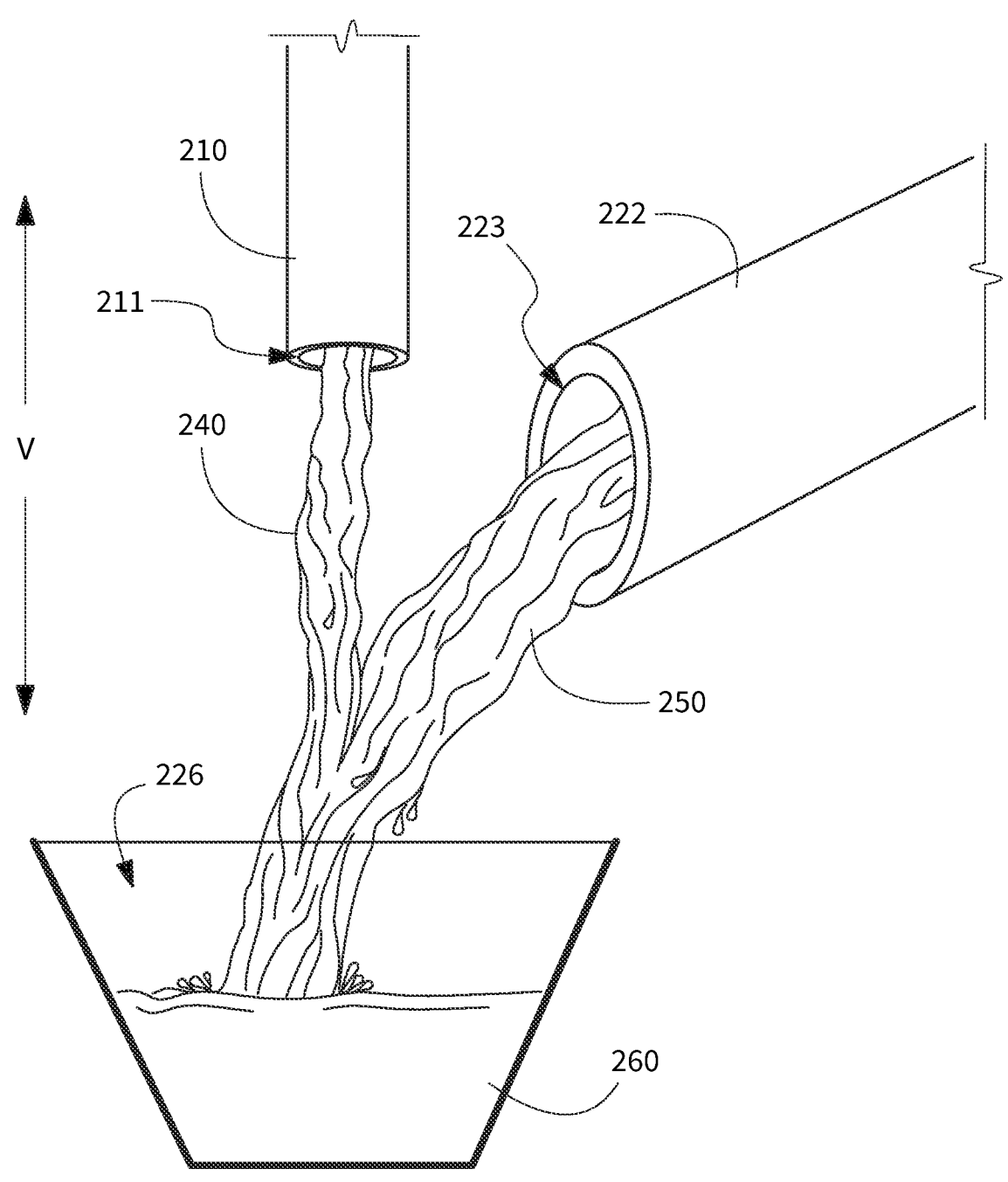
FIG. 10 provides a schematic illustration of an exemplary dispensing tube and an exemplary fill tube, along with exemplary liquid streams associated with each tube, as may be incorporated into an ice maker appliance or ice making assembly in accordance with one or more embodiments of the present disclosure.

Turning now to FIG. 10, an end portion of the dispensing tube 210 and a stream of additive 240 emanating from an outlet 211 of the dispensing tube 210 are illustrated, as well as an end portion of the water fill tube 222 with a stream of water 250 emanating from an outlet 223 of the water fill tube 222. As may be seen in FIG. 10, the water fill tube 222 is oriented at an oblique angle to the vertical direction V, such that the stream of water 250, which flows to the water fill tube 222 at a generally constant pressure from one or more valves within the refrigerator appliance 100 (or other ice maker appliance) and upstream of the water fill tube 222 defines an arcuate path outward from the end portion of the water fill tube 222 and downward along the vertical direction V under the combined influence of the upstream water pressure as the stream of water 250 exits the water fill tube 222 and the force of gravity on the stream of water 250.

The end portion of the dispensing tube 210 may be oriented generally along or parallel to the vertical direction V, such that the stream of additive 240 from the dispensing tube 210 flows generally straight down. In some embodiments, the end portion of the dispensing tube 210 may be centered over the center of the mold cavity 226. The end portion of the dispensing tube 210 may be positioned directly in front of the end portion of the fill tube 222, e.g., along the flow direction of the stream of water 250. The outlet 211 of the dispensing tube 210 may be positioned above the outlet 223 of the fill tube 222. The outlet 211 of the dispensing tube 210 may be offset from the outlet 223 of the fill tube 222 generally along a horizontal direction, e.g., a direction perpendicular to the vertical direction V. The end portion of the dispensing tube 210 may be aligned along a tangent to the arcuate stream of water 250 from the fill tube 222. The stream of additive 240 and the stream of water 250 may intersect in the air, e.g., above the mold cavity 226, forming a mixture 260 of water and additive. The mixture 260 may be generated at least in part due to the intermixing of the streams 240 and 250 outside of (e.g., above) the mold cavity 226 and at least in part due to kinetic energy of the falling stream as the liquid lands in the mold cavity 226. Thus, the outlet 211 of the dispensing tube 210 may be aligned with the outlet 223 of the fill tube 222 such that the flow of the liquid additive from the dispensing tube 210 mixes with the flow of liquid water from the fill tube 222 to form a mixed flow of liquid water and liquid additive.

As may be seen in FIG. 10, the size, e.g., inner diameter, of the dispensing tube 210 may be less than, such as about half of or less than half of, the size, e.g., inner diameter, of the fill tube 222. Additionally, the dosing pump may be configured to provide a relatively slow velocity (e.g., low pressure) flow of additive through the dispensing tube 210. Thus, the rate of flow of the stream of additive 240 may be much lower than the rate of flow of the stream of water 250, such as the stream of additive 240 may be much smaller and slower than the stream of water 250. For example, the flows may be synchronized, such that the flow time during a fill is the same for both streams, while the stream of additive 240 may be much smaller and slower such that the additive may account for about two percent of the mixture 260 or less, such as about 1.5% or less, such as about 1% or less, such as about 0.5% or less.

Accordingly, the mold body 220, e.g., the one or more mold cavities 226 therein, may be positioned downstream of the dispensing tube 210 and downstream of the fill tube 222. The mold cavity 226 may be configured for receiving the mixed flow of liquid water and liquid additive such that the mixture 260 of liquid water and liquid additive is formed at least partially in the mold cavity 226, e.g., the mixture 260 may be partially formed outside of the mold cavity 226 as the liquid flows to the mold cavity 226 and further mixing may occur in the mold cavity 226. The mold cavity 226 may be further configured for retaining the mixture 260 of liquid water and liquid additive to form an ice piece from the mixture 260 in the mold cavity.

The mold cavities 226 in the mold body 220 may be relatively fewer in number and may be larger than typical mold cavities of a conventional, e.g., plain water, ice maker. For example, the ice making assembly 200 may include only four or fewer mold cavities, such as only two mold cavities (as illustrated) or only one mold cavity. The relatively large and deep mold cavity 226 (e.g., as compared to mold cavities of typical plain ice makers) may contain the mixture 260 and promote mixing thereof while minimizing splashing or spilling of the mixture 260 from the mold cavity 226.

In some embodiments, in particular embodiments where the mold body 220 is or is a part of a twist tray for automatically harvesting the ice pieces, mixing of the water and additive may also be promoted by rocking the mold body 220 back and forth, e.g., using rotors which are coupled to the mold body 220 for rotating the mold body 220 by about one hundred and eighty degrees (180°) in order to dump ice pieces from the mold body 220 into the ice bin 230, where the rocking motion may include a lesser degree of rotation in a back-and-forth oscillatory manner such that the water and additive are mixed within the mold body 220 without spilling out of the mold body 220. For example, the rotor may be a part of, or may be coupled to, a harvest motor which is actuated to harvest ice pieces from the mold body 220. The harvest motor may be a DC motor which is selectively rotatable in a first direction, e.g., clockwise, or a second direction opposite the first direction, e.g., counter-clockwise, depending on the polarity of the DC power supplied to the harvest motor. Thus, for example, the harvest motor may be operable to twist the mold body 220 to release ice pieces from the mold body 220 and then may be operable to rotate the mold body 220, e.g., by about one hundred and eighty degrees (180°) as mentioned, to transfer the released ice pieces from the mold body 220 into a storage bin therebelow. Similarly, the harvest motor may be operable to provide the rocking motion to the mold body 220 in order to promote mixing, such as by switching (e.g., reversing) the polarity of DC power supplied to the harvest motor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
a cabinet;
a chilled chamber defined within the cabinet; and
an ice making assembly, the ice making assembly comprising:
   an additive dispensing assembly comprising an additive cup configured to receive a volume of liquid additive and a dispensing tube downstream of the additive cup;
   a mold body comprising a mold cavity; and
   a fill tube in fluid communication with a water supply, the fill tube oriented at an oblique angle, whereby a flow of liquid water from the fill tube defines an arcuate path from an outlet of the fill tube, an outlet of the dispensing tube aligned along a tangent to the arcuate path, whereby a flow of the liquid additive from the dispensing tube intersects the flow of liquid water from the fill tube above the mold body and mixes with the flow of liquid water from the fill tube to form a mixed flow of liquid water and liquid additive, wherein
   the mold body is positioned downstream of the dispensing tube and the fill tube, the mold cavity configured for receiving the mixed flow of liquid water and liquid additive whereby a mixture of liquid water and liquid additive is formed in the mold cavity, the mold cavity further configured for retaining the mixture of liquid water and liquid additive to form an ice piece from the mixture in the mold cavity.

2. The refrigerator appliance of claim 1, wherein the additive dispensing assembly of the ice making assembly further comprises a dosing pump coupled to the additive cup between the additive cup and the outlet of the dispensing tube.

3. The refrigerator appliance of claim 2, wherein the dosing pump is a peristaltic pump.

4. The refrigerator appliance of claim 3, wherein the peristaltic pump is actuated by a stepper motor.

5. The refrigerator appliance of claim 1, wherein the outlet of the dispensing tube is positioned above the outlet of the fill tube.

6. The refrigerator appliance of claim 1, wherein the outlet of the dispensing tube is oriented generally along a vertical direction.

7. The refrigerator appliance of claim 1, wherein the outlet of the dispensing tube is offset from the outlet of the fill tube generally along a horizontal direction.

8. The refrigerator appliance of claim 1, wherein the ice making assembly consists of four or fewer mold cavities.

9. The refrigerator appliance of claim 1, wherein the ice making assembly is mounted on an internal surface of a door of the refrigerator appliance.

10. The refrigerator of claim 1, wherein the ice making assembly is an auxiliary ice making assembly, further comprising a primary ice making assembly separate from the ice making assembly.

11. An ice maker appliance, comprising:
an additive dispensing assembly comprising an additive cup configured to receive a volume of liquid additive and a dispensing tube downstream of the additive cup;
a mold body comprising a mold cavity; and
a fill tube in fluid communication with a water supply, the fill tube oriented at an oblique angle, whereby a flow of liquid water from the fill tube defines an arcuate path from an outlet of the fill tube, an outlet of the dispensing tube aligned along a tangent to the arcuate path, whereby a flow of the liquid additive from the dispensing tube intersects the flow of liquid water from the fill tube above the mold body and mixes with the flow of liquid water from the fill tube to form a mixed flow of liquid water and liquid additive, wherein
the mold body is positioned downstream of the dispensing tube and the fill tube, the mold cavity configured for receiving the mixed flow of liquid water and liquid additive whereby a mixture of liquid water and liquid additive is formed in the mold cavity, the mold cavity further configured for retaining the mixture of liquid water and liquid additive to form an ice piece from the mixture in the mold cavity.

12. The ice maker appliance of claim 11, wherein the additive dispensing assembly further comprises a dosing pump coupled to the additive cup between the additive cup and the dispensing tube.

13. The ice maker appliance of claim 12, wherein the dosing pump is a peristaltic pump.

14. The ice maker appliance of claim 13, wherein the peristaltic pump is actuated by a stepper motor.

15. The ice maker appliance of claim 11, wherein the outlet of the dispensing tube is positioned above the outlet of the fill tube.

16. The ice maker appliance of claim 11, wherein the outlet of the dispensing tube is oriented generally along a vertical direction.

17. The ice maker appliance of claim 11, wherein the outlet of the dispensing tube is offset from the outlet of the fill tube generally along a horizontal direction.

18. The ice maker appliance of claim 11, wherein the mold body consists of four or fewer mold cavities.

* * * * *